United States Patent [19]

Reichelt

[11] Patent Number: 5,307,403
[45] Date of Patent: Apr. 26, 1994

[54] TELEPHONE BRANCH LINE TRANSMISSION CIRCUIT WITH BLOCKING CAPACITOR

[75] Inventor: Ingo Reichelt, Schwabach, Fed. Rep. of Germany

[73] Assignee: U.S. Philips Corporation, New York, N.Y.

[21] Appl. No.: 989,623

[22] Filed: Dec. 14, 1992

[30] Foreign Application Priority Data

Dec. 12, 1991 [DE] Fed. Rep. of Germany ....... 4140904

[51] Int. Cl.[5] ............................................. H04M 3/22
[52] U.S. Cl. .................................. 379/286; 379/379; 307/246; 307/254; 307/570
[58] Field of Search ............... 307/241, 246, 248, 282, 307/570, 582, 254; 379/286, 379

[56] References Cited

U.S. PATENT DOCUMENTS

| | | | |
|---|---|---|---|
| 3,333,113 | 7/1967 | Cole et al. | 307/241 |
| 3,458,799 | 7/1969 | Collings | 307/240 |
| 3,555,298 | 1/1971 | Neelands | 307/582 |
| 3,660,683 | 5/1972 | Wangard | 307/241 |
| 3,838,923 | 9/1974 | Shah | 307/246 |
| 4,251,743 | 2/1981 | Hareyama | 307/254 |

FOREIGN PATENT DOCUMENTS 0371558  11/1989  European Pat. Off. .
3541548  6/1987  Fed. Rep. of Germany .

Primary Examiner—William L. Sikes
Assistant Examiner—Shawn Riley
Attorney, Agent, or Firm—Leroy Eason

[57] ABSTRACT

A telephone branch line transmission circuit includes a control device which receives dial pulses and in response thereto controls at least two switching devices arranged between two branch lines to a telephone exchange. A blocking capacitor is coupled to the first switching device. In order to prevent charging of such capacitor from distorting the current supplied from the exchange at the end of a dial pulse, the first switching device is included between the blocking capacitor and one of the branch lines. The connection node thereof with the blocking capacitor is connected to a terminal of a second switching device, another terminal of which is coupled to the second branch line. The control terminal of the second switching device is connected to a storage capacitor. In the off-state of the switching devices no residual direct current can flow from the exchange to charge the blocking capacitor. Consequently, upon termination of a dial pulse, the blocking capacitor cannot distort the current supplied by the exchange. The storage capacitor charges during dial pulses and establishes a high impedance across the branch lines after dialing is completed.

5 Claims, 2 Drawing Sheets

TELEPHONE BRANCH LINE TRANSMISSION CIRCUIT WITH BLOCKING CAPACITOR

BACKGROUND OF THE INVENTION

The invention relates to a telephone branch line transmission circuit comprising a control device adapted to at least supply dial pulses and to control at least a first and a second switching device arranged between a first and a second branch line, and comprising a blocking capacitor coupled to the first branch line.

EP-A2-0,371,558, which corresponds to U.S. Pat. No. 5,121,425, issued Jun. 9, 1992, assigned to the present assignee, discloses a transmission circuit of the aforesaid type in which a series arrangement of two switching devices is arranged between two branch lines in parallel with the transmission direction. A blocking capacitor is connected to one branch line in order to block the flow of direct current. The blocking capacitor has its other terminal connected to a secondary terminal of a transformer whose primary terminals are connected, for example, to a terminal unit comprising a hybrid circuit, an amplifier and a telephone set. The secondary terminals of the transformer are coupled to a telephone exchange via the transmission circuit.

The control device, which comprises an optocoupler, supplies loop-closing and dial pulses to the switching devices. The first switching device comprises a MOS field-effect transistor and the second switching device comprises a bipolar transistor. The bipolar transistor is coupled to a voltage divider and a storage capacitor, the node between the two voltage-divider resistors being connected to one terminal of the storage capacitor and to the base of the bipolar transistor. One voltage-divider resistor has its other terminal connected to the control device. The bipolar transistor has its collector connected to one branch line and its emitter to the drain terminal of the MOS field-effect transistor of the first switching device. The field-effect transistor has its gate terminal coupled to a further voltage divider, which is connected to the control device, and its source terminal to a branch line.

Upon a loop-closing or dial pulse, the MOS field-effect transistor and the bipolar transistor allow the passage of direct current after a charging time of the storage capacitor. As a result of this, a loop is completed between the two branch lines.

A problem with such circuit is that in the cut-off state of the transistors of the two switching devices the exchange generally supplies a residual direct current, as a result of which the blocking capacitor is charged. Upon switching off, i.e. upon termination of the loop-closing or dial pulse, the transistors are turned off. However, that permits charging of the blocking capacitor by the residual direct current, which leads to distortions in the current supplied by the exchange in response to a dial pulse. As a result of this, the exchange may inaccurately detect the end of a dial pulse.

SUMMARY OF THE INVENTION

Therefore, it is an object of the invention to provide a telephone branch line transmission circuit which prevents the current supplied by the exchange from being distorted by the blocking capacitor.

In a transmission circuit of the type defined in the opening paragraph this object is achieved in that the first switching device has one terminal coupled to the first branch line and its other terminal to the second switching device and the blocking capacitor, and the terminal of the second switching device which is not coupled to the first switching device is coupled to the second branch line.

In accordance with the invention the first switching device is arranged in the transmission circuit in such a manner that in the off-state of the switching devices no residual direct current can flow from the exchange to the blocking capacitor. Consequently, the blocking capacitor cannot be charged by the exchange after a dial pulse has been switched off and hence cannot distort the current supplied by the exchange.

A simple transmission circuit is obtained if the two switching devices are transistors which are turned on during dial pulses. The control terminal of the first switching device is coupled to an output of the control device and the control terminal of the second switching device is coupled to the node between the first switching device and the blocking capacitor. In the case of a loop-closing or dial pulse the control device turns on the transistor of the first switching device via a control terminal of such transistor. In the on state the first switching device carries a current which flows from the control terminal of the transistor of the second switching device, for example via a resistor. As a result, that transistor is also turned on. This embodiment has the advantage that it exhibits a very low impedance in the on state.

Another feature of the transmission circuit is obtained if the two switching devices are transistors having their respective control terminals coupled to an output of the control device. When the control device, which may comprise for example an optocoupler, receives a dial pulse it turns on the respective transistors of the two switching devices. The direct current supplied by the exchange can then flow via these two transistors. The blocking capacitor blocks the direct current supplied by the exchange, but an alternating current can flow between the exchange and, for example, a terminal unit via the blocking capacitor and the transformer. The transistor of the second switching device may be a bipolar transistor having its collector coupled to the node between the blocking capacitor and the first switching device, having its emitter coupled to the second branch line, and having its base, which serves as the control terminal, coupled to the control device. In this embodiment the bipolar transistor is controlled directly by the control device via the base terminal.

In another embodiment, in which the transistor of the second switching device is a bipolar transistor, this transistor is controlled via the transistor of the first switching device. In this embodiment the bipolar transistor has its collector and its base, which serves as the control terminal, both coupled to the node between the blocking capacitor and the first switching device, and its emitter to the second branch line. The bipolar transistor is not turned on until the transistor of the first switching device has become conductive and a current has flowed to the base of the bipolar transistor via the transistor of the first switching device.

The transistor of the first switching device is preferably a MOS field-effect transistor whose source terminal is coupled to the first branch line, whose drain terminal is coupled to the blocking capacitor, and whose gate terminal, which serves as the control terminal, is coupled to the control device. For the first switching device a MOS field-effect transistor is selected because its forward resistance for direct current is very low.

A further feature of the invention is that a storage capacitor is coupled to the base of the bipolar transistor of the second switching device. The storage capacitor establishes a high a.c. impedance of the transmission circuit in the steady state.

Owing to the storage capacitor the bipolar transistor is not turned on for a delay interval following the starting instant of a loop-closing or dial pulse. As a result of this, the exchange often cannot detect in a short enough time that the terminal unit associated with the transmission circuit is busy. In order to enable a busy state to be quickly detected by the exchange, the bipolar transistor of the second switching device has its emitter coupled to the base of another bipolar transistor serving as a first switching transistor, the collector of which is connected to the storage capacitor and the emitter of which is connected to the second branch line. The first switching transistor charges the storage capacitor after switching on. However, the first switching transistor is not turned on and, as a result, charging of the storage capacitor does not begin, until a specific threshold current has been reached at the base of such transistor. This delayed charging of the storage capacitor ensures that the current through the bipolar transistor of the second switching device has time to become sufficiently large to enable the busy state to be recognized by the exchange. The impedance of the transmission circuit is therefore initially low because the switching capacitor is not in circuit. The impedance of the transmission circuit increases as the storage capacitor is charged.

Upon starting, a direct current flowing to the exchange builds up to a steady-state value. In order to reduce the build-up time the following embodiment may be employed. The emitter of the bipolar transistor of the second switching device is coupled to the base of a first switching transistor constituted by a bipolar transistor which has its emitter coupled to the second branch line and its collector to a gate terminal of a MOS field-effect transistor forming a second switching transistor. The drain terminal of the second switching transistor is coupled to the first branch line and the source terminal of the second switching transistor is coupled to the base of the bipolar transistor forming the second switching device. As a result of these steps the storage capacitor is charged additionally via the second switching transistor, which reduces the build-up time.

After starting, the transmission circuit exhibits a low impedance because the bipolar transistor of the second switching device is turned on immediately. In order to ensure that the impedance of the transmission circuit does not increase immediately, a further capacitor is arranged between the base and the emitter of the bipolar transistor forming the first switching transistor. Until this capacitor is charged the first switching transistor is not turned on. Thus, this capacitor ensures that upstream of the exchange the transmission circuit initially has the same impedance after the starting process begins.

In a modification of the invention the bipolar transistor of the second switching device may be of a low-voltage type. Low-voltage bipolar transistors have a higher current gain than high-voltage types. In view of the required dielectric strength upon turn-off, a high-voltage transistor is needed in the afore-mentioned EP-A2-0,371,558. In order to obtain the desired high current gain and thus a high impedance of the transmission circuit in the operating condition, the aforesaid prior art (EP-A2-0,371,558) employs a Darlington transistor. The transmission circuit in accordance with the invention does not require a high-voltage bipolar transistor, so that it may be a low-voltage type having a high current gain and so the transmission circuit will have a high impedance. Thus, the transmission circuit will have only a minimal influence on signals from the terminal unit.

The transmission circuit can be used in a telephone system for the transmission of signals between an exchange and a terminal unit. The transmission circuit supplies dial pulses from the terminal unit to the exchange and transfers alternating circuit signals between the terminal unit and the exchange. A terminal unit may comprise, for example, a hybrid circuit, an amplifier and a telephone.

BRIEF DESCRIPTION OF THE DRAWINGS

Three embodiments of a transmission circuit and a telephone transmission system will now be described in more detail, by way of example, with reference to FIGS. 1 to 4, wherein.

DETAILED DESCRIPTION OF THE PREFERRED EMBODIMENTS

Figure 1:
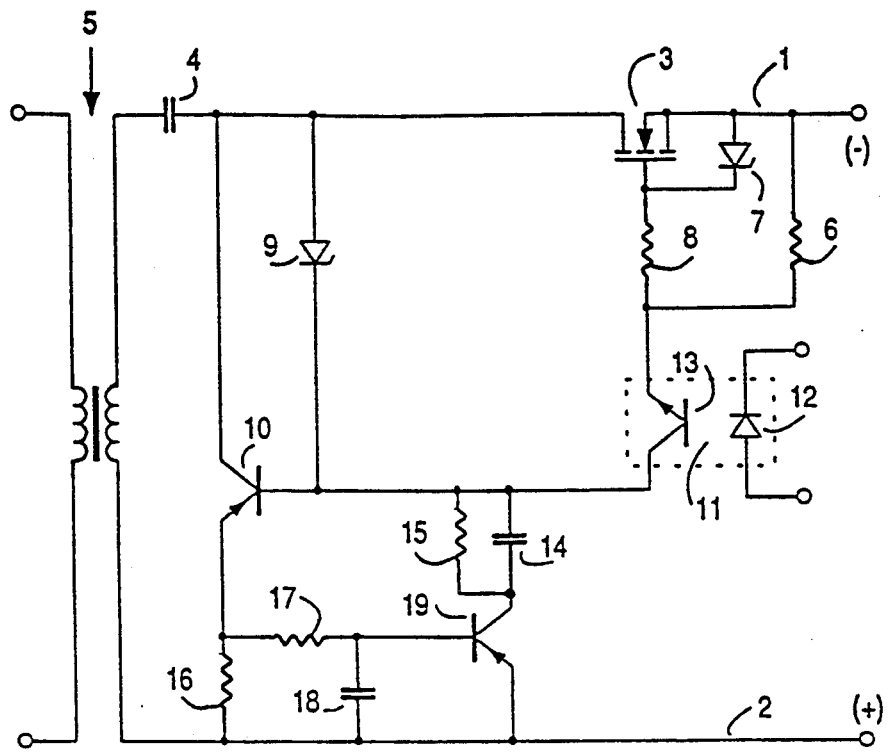
FIG. 1 shows a circuit diagram of a transmission device constructed in accordance with a first embodiment of the present invention.

The transmission circuit shown in FIG. 1 is coupled to an exchange of a telecommunication system via two branch lines 1 and 2. The branch line 1 is connected to a secondary terminal of a transformer 5 via an N-channel MOS field-effect transistor 3 and a blocking capacitor 4. The other secondary terminal of the transformer 5 is connected to the branch line 2. The primary side of the transformer 5 is connected to a terminal unit (not shown) comprising a hybrid circuit, an amplifier and a telephone set or alternatively a modem. The MOS field-effect transistor 3 forms part of a first switching device. The source terminal of the transistor 3 is connected to the branch line 1, a resistor 6 and the anode of a zener diode 7. The gate terminal forms a node common to the cathode of the zener diode 7 and a resistor 8. The drain terminal of the transistor 3 is connected to the blocking capacitor 4, to the anode of a further zener diode 9 and to the collector of a bipolar PNP-type transistor 10 forming part of a second switching device.

The other terminal of the resistor 6 and the other terminal of the resistor 8 are connected to an output o a control device 11 whose input is coupled to a loop-closing and dial pulse generator. The control device 11 is an optocoupler comprising a light-emitting diode 12 and a phototransistor 13. The light-emitting diode 12 is connected to the loop-closing and dial pulse generator (not shown). The emitter of the phototransistor 13 is connected to the resistor 6 and the resistor 8. The collector of the phototransistor 13 is connected to a storage capacitor 14, a resistor 15, the cathode of the zener diode 9 and the base of the transistor 10.

Moreover, two resistors 16 nd 17 are connected to the emitter of the transistor 10. The other terminal of the resistor 16 is connected to the branch line 2 and the other terminal of the resistor 17 is connected to a capacitor 18 and to the base of a first switching transistor 19 (bipolar PNP transistor). The collector of the first switching transistor 19 is connected to the other terminal of the storage capacitor and the other terminal of the resistor 15. The emitter and the other terminal of the capacitor 18 are connected to the branch line 2.

A pulse generated by the loop-closing and dial pulse generator (not shown) and applied to the light-emitting diode 12 turns on the phototransistor 13, which subsequently turns on the MOS field-effect transistor 3 of the first switching device. That causes bipolar transistor 10 to also turn on, thereby allowing passage of direct current from the exchange to the branch line 2 via the branch line 1 and the two transistors 3 and 10. Upon switching off, i.e. when the dial pulse has ended, the transistors 3 and 10 are turned off and so the blocking capacitor 4 is effectively disconnected from the branch line 1. As a result of this, the blocking capacitor 4 cannot give rise to distortion of the current supplied by the exchange because this capacitor is not charged by a residual direct current from the exchange during turn off.

In order to explain the operation of the circuit section comprising the resistors 15, 16 and 17, storage capacitor 14, capacitor 18 and first switching transistor 19, it is initially assumed that the capacitor 18 is not present in the circuit. After application of a dial pulse, when a given threshold current is reached through the resistor 16 the first switching transistor 19 turns on and so the node common to the storage capacitor 14 and the resistor 15 will be at the same potential as the branch line 2. The storage capacitor 14 then charges until it reaches a steady state. This part of the circuit ensures that the transmission device has a low impedance at the starting instant, because since transistor 19 is not yet on the storage capacitor 14 and the resistor 15 remain switched out of circuit. Owing to the resulting low-impedance state at the starting instant, the exchange can reliably detect if there is a busy state of a terminal unit coupled to the transformer.

By means of the capacitor 18 it is achieved that the initial level of the current flowing through the resistor 16 is sustained for a longer time, thereby delaying turn-on of transistor (19) in order to enable the low-impedance state of the transmission circuit to be maintained for a longer time. After the capacitor 18 has been charged the first switching transistor 19 turns on, and so the combination of the resistor 15 and the storage capacitor 14 is switched into circuit.

The storage capacitor 14 establishes a high a.c. impedance of the transmission circuit in the steady state.

The bipolar transistor 10 should be of the low-voltage type in order to enable a high current gain to be obtained. When the current gain is high it is possible to select a higher resistance value for the resistor 8. As a result of the higher resistance of the resistor 8 the transmission device has a higher impedance and consequently its influence on the signals supplied by the terminal unit via the transformer is reduced. The two zener diodes 7 and 9 have a protective function (voltage limiting). Moreover, a current for charging the capacitor 14 is supplied via the zener diode 9 during the starting process to speed up charging.

Figure 2:
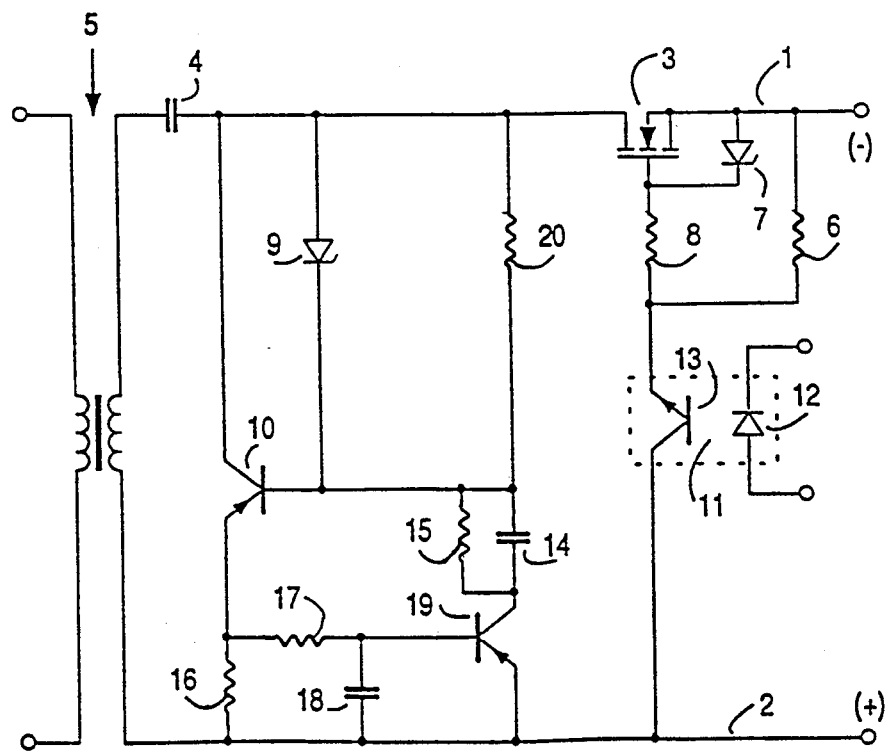
FIG. 2 shows a circuit diagram of a transmission device constructed in accordance with a second embodiment of the present invention.

FIG. 2 shows a further embodiment of a transmission device. This embodiment differs from the embodiment shown in FIG. 1 in that the collector of the phototransistor 13 is not connected to a terminal of the storage capacitor 14 but to the branch line 2, and in that a further resistor 20 is connected in parallel with the zener diode 9. The remainder of the circuit is identical to the circuit in FIG. 1. The transistor 10 is controlled by the control device 11 in that the transistor 3 is turned on when a pulse appears and, as a consequence, a current flows to the base of the transistor 10 via the resistor 20 and the zener diode 9. Upon starting, the impedance of the embodiment shown in FIG. 2 is lower than the impedance of the embodiment shown in FIG. 1. In the embodiment shown in FIG. 1 the impedance of the transmission device is dictated by the resistors 6 and 16, by the transistors 3 and 10, and by the transistor 13 of the control device 11. In the embodiment shown in FIG. 2 the impedance of the circuit arrangement upon starting is dictated by the two transistors 3 and 10 and by the resistors 6 and 16.

Figure 3:
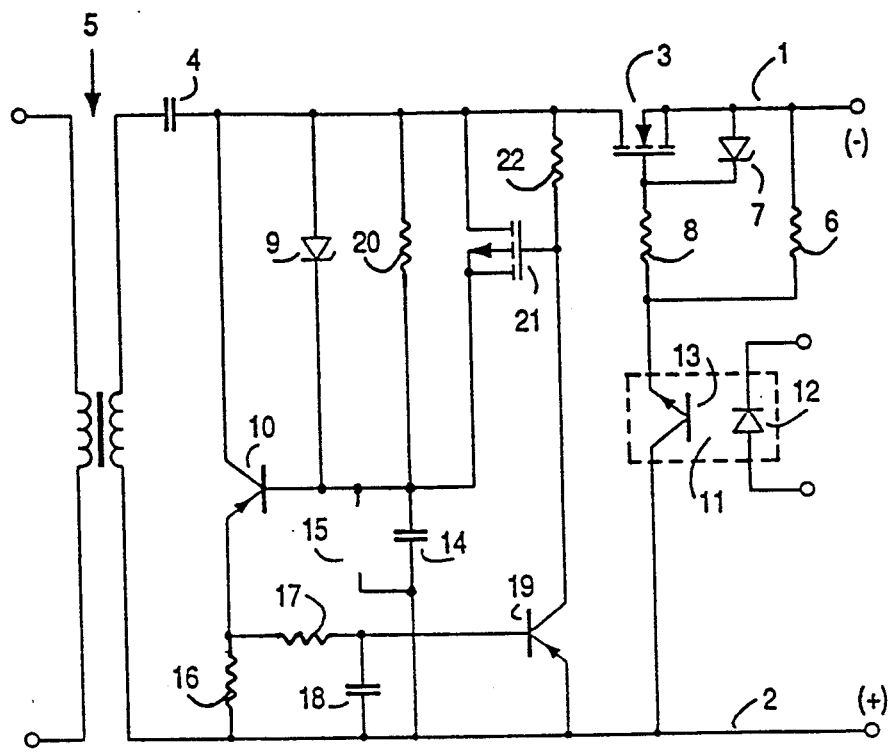
FIG. 3 shows a circuit diagram of a transmission device constructed in accordance with a third embodiment of the present invention.

FIG. 3 shows a further embodiment of a transmission device. The embodiment shown in FIG. 3 differs from the embodiment shown in FIG. 2 in that it comprises an additional second switching transistor 21 in the form of a P-channel MOS field-effect transistor, and an additional resistor 22. In this embodiment the collector of the first switching transistor 19 is coupled to the gate terminal of the transistor 21. A node common to the storage capacitor 14 and the resistor 15 is coupled to the branch line 2. The source terminal of the transistor 21 is coupled to the node common to the resistors 15 and 20, the base of the transistor 10, and the cathode of the zener diode 9, and to a terminal of the storage capacitor 14. The drain terminal of the second switching transistor 21 is connected to the branch line 1. Moreover, the resistor 22 is arranged between the gate terminal of the second switching transistor 21 and the branch line 1. In the transmission device shown in FIG. 1 the build-up time to reach the steady value is dictated by the resistor 15 and the storage capacitor 14. The addition of the second switching transistor 21 reduces the build-up time in comparison with that in the transmission device shown in FIG. 1 or FIG. 2. The storage capacitor 14 is now charged additionally via the transistor 21.

Figure 4:
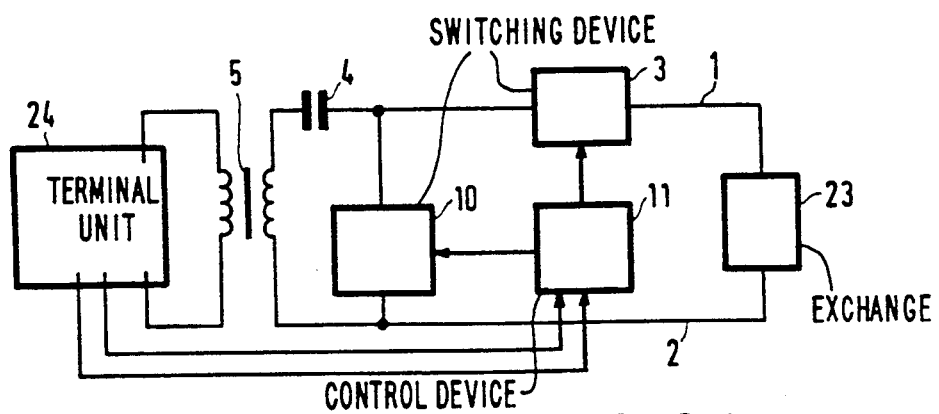
FIG. 4 shows a transmission system including a transmission device constructed in accordance with the present invention.

FIG. 4 shows a transmission system comprising a transmission circuit as described which is coupled to an exchange 23 via two branch lines 1 and 2. Moreover, the primary terminal of the transformer 5 is coupled to a terminal unit 24 which supplied the dial pulses to the control device 11. The reference numerals used in FIG. 4 correspond to those in the other Figures.

I claim:

1. A telephone branch line transmission circuit comprising first and second switching devices for connection between a first and second branch line to a telephone exchange, a control device for controlling said switching devices in accordance with dial pulses received by said control device from the exchange, and a blocking capacitor for coupling the first branch line to a telephone terminal; characterized in that:

the first switching device comprises a transistor (3) coupled in series between the blocking capacitor (4) and the first branch line and having a control terminal coupled to the control device (11), said transistor (3) being turned on by said control device (11) when a dial pulse is received and being turned off by said control device (11) upon termination of a received dial pulse;

the second switching device comprises a first bipolar transistor (10) having an emitter coupled to the second branch line by a resistor, a collector coupled to the connection node between blocking capacitor (4) and the first switching device transistor (3), and a base which is also coupled to said connection node;

a storage capacitor (14) coupled to the base of the first bipolar transistor (10); and a second bipolar transistor (19) having a base coupled to the emitter of the first bipolar transistor (10), an emitter coupled to the second branch line, and a collector coupled directly or by intermediate coupling means to said capacitor (14); turn-on of the second bipolar transistor (19) being produced by said first bipolar transistor (10) after a delay interval following turn-on of said first bipolar transistor (10), said storage capacitor (14) being charged by current initiated by turn-on of said second bipolar transistor (19);

whereby turn-on of said first switching device in response to a received dial pulse causes turn-on of said bipolar transistor (10) to thereby produce a low impedance between said branch lines, and charging of said storage capacitor (14) after said delay interval following turn-on of said second bipolar transistor (19) produces a high impedance between said branch lines.

2. A transmission circuit as claimed in claim 1, wherein the control terminal of the first switching device transistor (3) and the base of the second switching device transistor (10) are each coupled to an output of said control device (11).

3. A transmission circuit as claimed in claim 1, wherein the first switching device transistor (3) is a field-effect transistor having a source terminal connected to the first branch line, a drain terminal connected to said blocking capacitor (4), and a gate terminal which constitutes the control terminal of said transistor (3).

4. A transmission circuit as claimed in claim 1, wherein said intermediate coupling means is a field effect transistor (21) having a gate terminal coupled to the collector of the second bipolar transistor (19), a drain terminal coupled to the first branch line, and a source terminal coupled to said storage capacitor (14).

5. A transmission circuit as claimed in claim 1, further comprising another capacitor (18) connected between the base and emitter of the second bipolar transistor (19) for delaying turn-on thereof following turn-on of the first bipolar transistor (10).

* * * * *